Sept. 30, 1952  C. B. OVERBAUGH  2,612,259
RADIAL HOLDER FOR TOOTHPICKS AND LIKE ARTICLES
Filed April 22, 1950

Inventor
Charles B. Overbaugh
By Whitehead & Vogl
Per: Earle Whitehead
Attorneys.

Patented Sept. 30, 1952

2,612,259

UNITED STATES PATENT OFFICE 2,612,259

RADIAL HOLDER FOR TOOTHPICKS AND LIKE ARTICLES

Charles B. Overbaugh, Denver, Colo.

Application April 22, 1950, Serial No. 157,457

2 Claims. (Cl. 206—20)

This invention relates to a holder for toothpicks and other similar articles, and has as an object to provide such a holder formed in an annular symmetrical pattern which is attractive in appearance, combining utility with beauty and which is especially adapted for manufacture using plastic materials.

Another object of this invention is to provide such a holder which radially disposes a plurality of retaining chambers wherein the toothpicks may be deposited in such a manner as to be presented for disposal by merely rotating the holder.

Another object of this invention is to provide such a holder having a radially disposed base with the elements forming the holder having a centroid positioned a comparatively short distance above the base whereby the holder cannot be easily overturned by accidental movements or jars.

Yet another object of this invention is to provide such a holder of a radially disposed pattern which is adapted to be easily gripped, lifted and rotated without disturbing the contents therein.

A further object of this invention is to provide such a holder wherein pleasing appearance is combined with desirable utility and which is adapted to be manufactured of low-cost plastic materials by exceedingly simple fabrication processes and so formed as to permit its manufacture by the simplest types of molds and operations thereof.

With these and other objects in view, my invention comprises certain novel constructions, combinations and arrangements of parts as herein described and defined in the appended claims and illustrated in preferred embodiment in the accompanying drawing in which:

Figure 1:
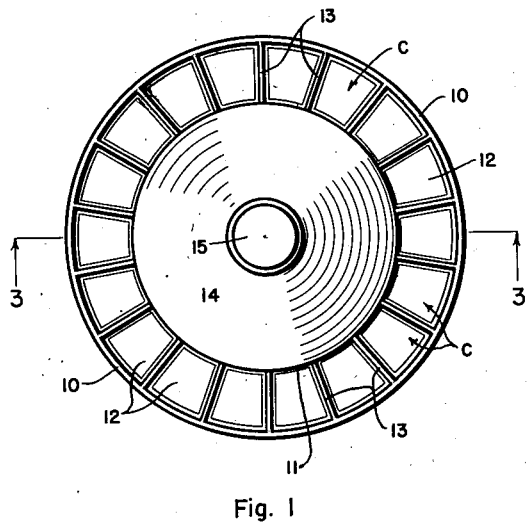
Figure 1 is a plan of an embodiment of the invention.
Figure 2:
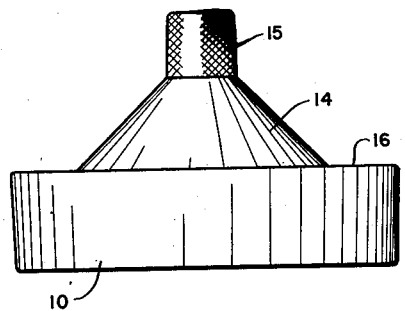
Figure 2 is an elevation of the structure shown in plan at Fig. 1.
Figure 3:
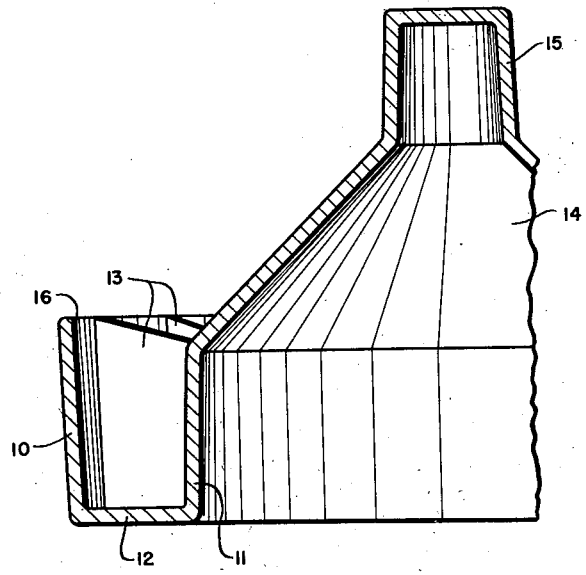
Figure 3 is a fragmentary section, on an enlarged scale, as taken substantially on the indicated line 3—3 of Fig. 1.

With the use of plastic materials for small articles of manufacture it is possible to attain the desirable features of utility, pleasing appearance, and low manufacturing cost. However, it appears that the present designs of toothpick holders and the types available are not suitably formed for production by presently used improved methods of manufacture, and none actually combines the above-mentioned desirable features. Actually the holders presently used are not particularly attractive according to present standards and are generally unsuitable to manufacture by low-cost injection molding methods. The present invention was conceived and developed to meet this need for an improved toothpick holder which combines certain novel features of construction with an improved novel arrangement of combinations of elements therein to adapt it for manufacture by injection molding of plastic materials using a two-piece die of the simplest character. It is to be further noted that the invention is also adapted for manufacture by other methods, such as fabrication of sheets and even with materials other than plastic.

In the present invention a plurality of compartments C are radially disposed about a central vertical axis and are formed and defined by a cylindrical outer wall 10, comprising the outer periphery of the structure, a concentric cylindrical inner wall 11, a base 12, and a plurality of upstanding radially disposed partitions 13 inside the annular trough defined by the outer wall 10, inner wall 11, and base 12. In the illustrated embodiment uniformly spaced compartments are shown, but such arrangement may be altered or varied as desired. The inner upstanding wall 11 suitably terminates at a point below the top of the outer wall 10 to thereby incline the partition tops downwardly toward the inner wall 11, whereby the excess height of the outer wall 10 forms a supporting rim whereon objects within the compartment, such as toothpicks, may lean, and yet such objects may be grasped, as by the fingers, at a point at or below the leaning contact point of the objects. The inner wall is continued from its upper rim by a conical frustum 14, preferably on an angle of 45°, which tapers inwardly above the compartments and toward the center and is capped by a cylindrical knob 15, knurled or grooved to facilitate the easy gripping thereof if desired. The structure of the frustum 14 and knob 15 is similar to that of the inner wall 11, being sheetlike in formation and not having excessive thickness, the interior of the knob 15 being preferably hollowed to save material.

The formation of the above-described structure is adapted for manufacture by a two-piece injection mold of a simple character. The female mold may constitute the upper portion of the structure including the compartments C, having its parting line at the top 16 of the outer wall 10. The matching male mold may constitute the outer periphery of the wall 10, the bottom of the base 12, and the inner face of the inner wall 11 and interior of the frustum 14 and knob 15. In such molding it is practical and convenient to hold the wall thickness of all elements uniform and still provide sufficient draft to clear a unit from the mold by tilting the outer wall 10 outwardly from the base to the top a small amount and tilting the inner wall inwardly from the base to the top a like amount and tapering or tilting the walls of the knob inwardly from bottom to top. The partitions 13 are suitably thickened adjacent to base 12, and with the narrowest section at the top adjacent the wall top 16 whereby they may be easily withdrawn from slotted openings in the female mold.

It is anticipated in the present structure that toothpicks or a variety of items will be placed in the compartments C in an annular pattern and thereby the items will be accessible from any direction, or, it is but a simple matter to rotate the holder as by the knob 15 to selectively direct a given compartment. The frustum is somewhat flattened, as on a 45° angle, to provide sufficient space between the surface of the frustum and the edge of the compartment and thereby permit an easy grasping of the articles placed within the compartment even though such articles be tilted outwardly as by leaning against the edge 16.

While I have herein described and illustrated in detail a preferred embodiment of my construction of the invention, it will be apparent that alternatives and equivalents of details of structure will occur to those skilled in the art which are within the scope and spirit of my invention. Therefore, it is my desire that I be limited in my protection only by the scope of the appended claims.

I claim:
1. As a new article of manufacture, a holder for toothpicks and like articles comprising, in combination, a ringed base, an annular outer wall upstanding the outer edge of said base, an inner annular wall upstanding the inner edge of said base and merging into a frustum topped by a round knob, adapted for manual gripping, and radial partitions between said walls forming an annular series of compartments.

2. The new article of manufacture as defined in claim 1 wherein said outer wall inclines outwardly from the perpendicular and the inner wall inclines inwardly from the perpendicular and said partitions decrease in thickness from their bottoms to their tops.

CHARLES B. OVERBAUGH.

REFERENCES CITED

The following references are of record in the file of this patent:

UNITED STATES PATENTS

| Number | Name | Date |
|---|---|---|
| 76,549 | Taylor | Apr. 7, 1868 |
| 435,023 | Robinson | Aug. 26, 1890 |
| 679,610 | Eckert | July 30, 1901 |
| 783,477 | Strauss | Feb. 28, 1905 |
| 986,395 | King | Mar. 7, 1911 |
| 1,477,890 | Neahr | Dec. 18, 1923 |
| 1,705,241 | Domerude | Mar. 12, 1929 |
| 2,083,973 | Zimmerman | June 15, 1937 |